United States Patent [19]

Rammer et al.

[11] 4,278,408
[45] Jul. 14, 1981

[54] MANURE TRANSFER PUMP

[75] Inventors: William L. Rammer; Paul D. Swanson, both of Kaukauna, Wis.

[73] Assignee: Badger Northland Inc., Kaukauna, Wis.

[21] Appl. No.: 74,203

[22] Filed: Sep. 10, 1979

[51] Int. Cl.³ .............................................. F04B 21/04
[52] U.S. Cl. .................................... 417/551; 417/900
[58] Field of Search ..................... 417/551, 900, 550; 198/747, 616, 540, 550

[56] References Cited

U.S. PATENT DOCUMENTS

| 762,230 | 6/1904 | Crapp et al. | 417/551 |
| 1,517,824 | 12/1924 | Brown | 417/551 X |
| 2,615,794 | 10/1952 | Shelby | 417/551 X |
| 3,687,311 | 8/1972 | Nesseth | 417/551 X |
| 3,872,981 | 3/1975 | Hedlund | 417/551 X |

Primary Examiner—Carlton R. Croyle
Assistant Examiner—Edward Look
Attorney, Agent, or Firm—Robert L. Farris

[57] ABSTRACT

A manure transfer pump with a cylinder, a piston reciprocable in the cylinder, a connecting rod connected to a mid section of the piston and a gate assembly pivotally mounted inside the piston between the axis of the connecting rod connection and the rod end of the piston. In operation, the gate assembly swings open during a return stroke and allows manure to pass through the piston. On a pumping stroke, the gate assembly closes and manure is forced out the discharge end of the cylinder and sucked in the inlet end at the same time.

2 Claims, 5 Drawing Figures

MANURE TRANSFER PUMP

TECHNICAL FIELD

The invention relates to a manure transfer pump for pumping manure, from a manure collection hopper in the floor of a livestock holding area, to a remote storage area. The manure is periodically removed from the storage area for disposal.

BACKGROUND ART

Manure handling systems in which the manure transfer pump is used are well-known. They are often used in Northern areas where it is not possible to spread manure on fields as fertilizer during the winter months. However, a manure transfer pump can be used in any area of the world when livestock are contained in a relatively small area and the manure is to be gathered and transferred to a manure storage facility. The pumps which are used must be able to convey manure containing some straw or other bedding material. In addition, the pump must be able to handle some sand, small rocks and other foreign material without sustaining damage.

DISCLOSURE OF THE INVENTION

The manure transfer pump is mounted in the bottom of a manure collection hopper in the floor of a livestock holding area. A mixture of manure and liquid is normally conveyed from the livestock holding area by mechanical or manual means but can also be washed into the manure collection hopper by a liquid. A pipe is connected to the manure transfer pump outlet to convey manure from the pump to a manure receiver. The manure receiver is normally a manure storage facility but could also be a manure spreader or even a manure processing plant.

The manure transfer pump includes a cylinder, a piston slidably supported in the cylinder, a connecting rod pivotally attached to the piston and a drive means connected to the connecting rod for reciprocating the piston back and forth in the cylinder.

The piston includes wall members with outer surfaces that are approximately the same size and shape as the inside surfaces of the cylinder. Trunnions are formed in the wall members of the piston for connection of the connecting rod. The connecting rod end of the piston and the head end of the piston are open. A gate is pivotally mounted inside the piston adjacent a piston wall and spaced from the head end. The gate swings up against one wall of the piston on a return stroke and allows manure to pass through the piston. On a pumping stroke, the gate swings down against a stop substantially closing the piston and forcing manure out of the cylinder. The gate has a free end which extends away from the cylinder wall, when the gate is open, so that on the start of the pumping stroke, manure in the cylinder forces the gate toward a closed position.

The gate pivot is spaced from the head end of the piston so that when the gate is open, most of the gate is inside the piston and is protected from damage and blockage by the piston walls. The stop is positioned so that the gate is in the center portion of the piston when closed. With a gate mounted in the piston in this position, maximum efficiency of the pump is obtained.

BEST MODE FOR CARRYING OUT THE INVENTION

The livestock confinement area 10 includes a floor 12 which is usually concrete. The floor 12 may be fully enclosed by walls 14 and a roof (not shown), open except for a retainer fence or it may be partially enclosed. The degree of protection required for the animals involved in the part of the world where the structure is located will dictate the construction of the enclosure.

Figure 1:
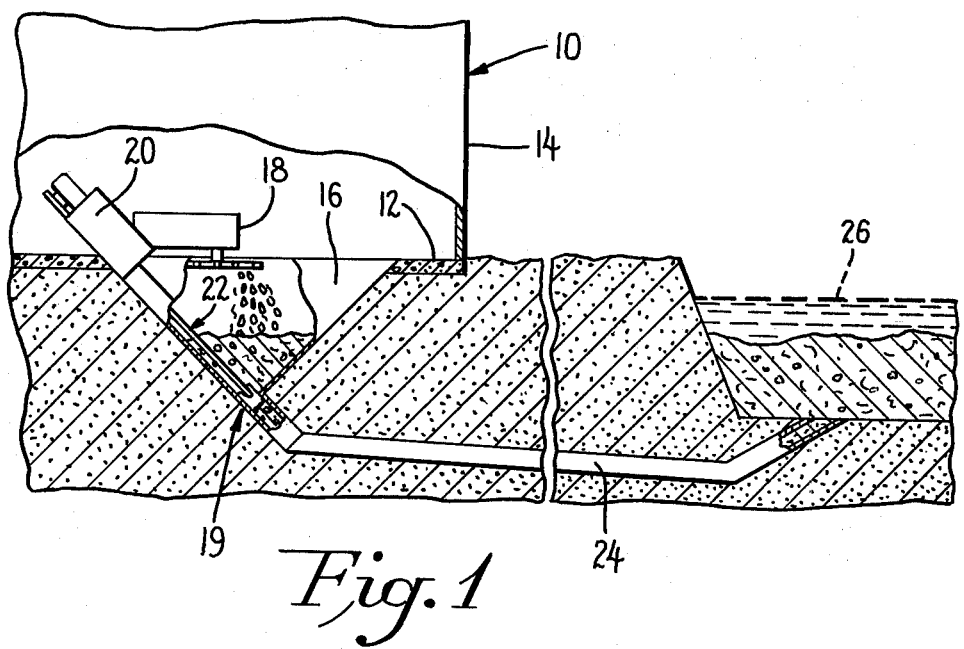
FIG. 1 is a diagrammatic elevation of a livestock area and a manure transfer and storage system employing the manure transfer pump of the present invention.
Figure 2:
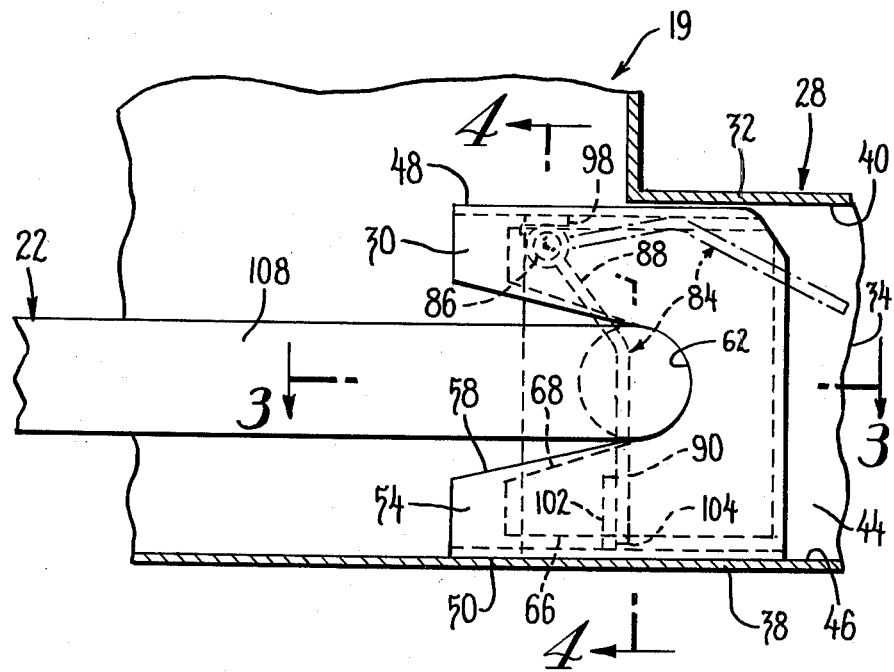
FIG. 2 is an enlarged sectional side elevation of the manure transfer pump of FIG. 1.
Figure 3:
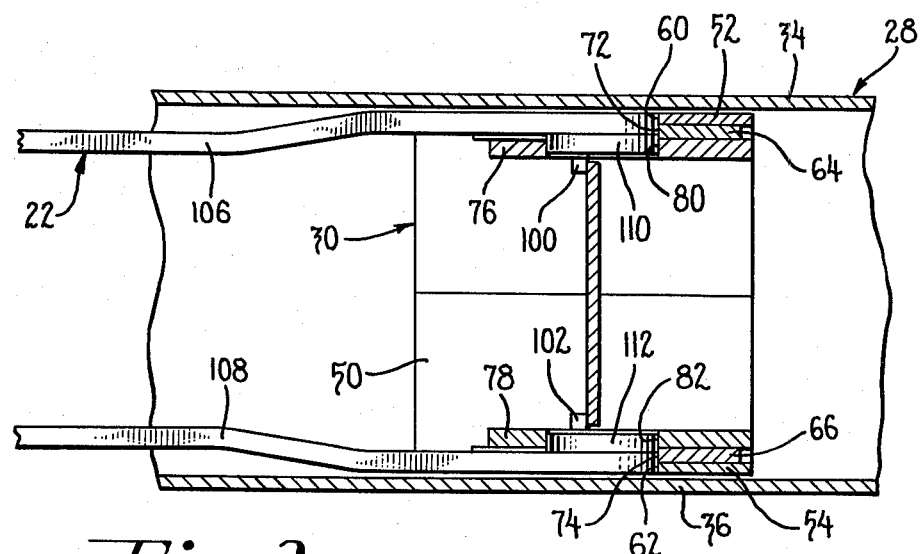
FIG. 3 is a sectional view of the manure transfer pump taken along the line 3—3 of FIG. 2.
Figure 4:
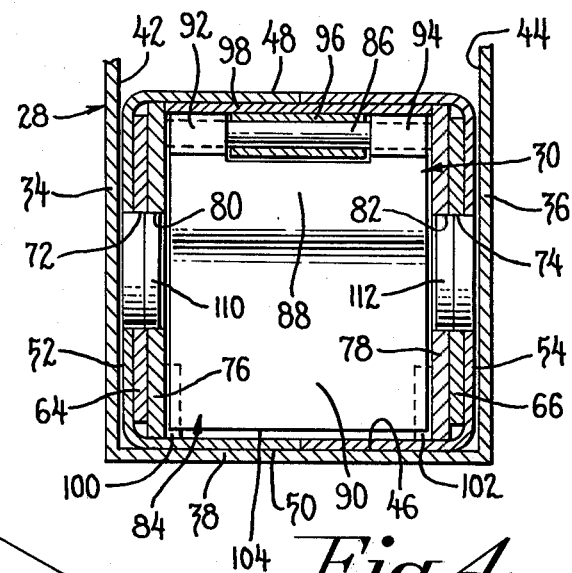
FIG. 4 is a sectional view of the manure transfer pump taken along the line 4—4 of FIG. 2.
Figure 5:
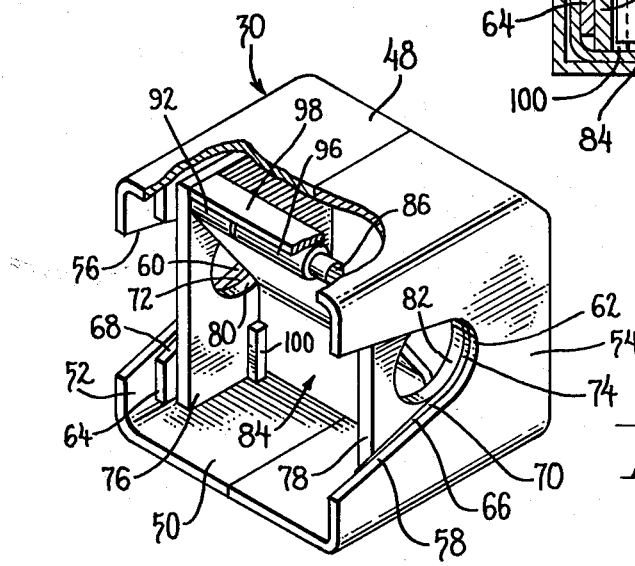
FIG. 5 is a perspective view of the manure transfer pump piston with portions broken away to show the piston construction.

A manure collection hopper 16 is constructed below the floor 12. A variety of machinery is available for removing manure from the floor 12 and depositing it in the manure collection hopper 16. This machinery includes a conventional barn cleaner 18 a portion of which is shown in FIG. 1.

A blade mounted on a tractor could also be used to scrape the floor 12. With a grate (not shown) over the top of the manure collection hopper 16, at least some of the manure could fall from the animal directly into the manure collection hopper 16.

A pump 19 is mounted in the bottom of the manure collection hopper 16. A pump drive 20 is secured to an upper side of the manure collection hopper above the highest expected level of manure. A connecting rod 22 interconnects the pump 19 and the pump drive 20 and is reciprocated by the pump drive 20.

A pipe 24 is connected to the pump 19 and conveys manure away from the livestock confinement area 10. As shown, the pipe 24 conveys manure to the bottom of a manure storage facility 26. By injecting fresh manure from the livestock confinement area 10 into the bottom of the manure storage facility 26, problems with frozen manure and snow and ice cover on the manure storage facility 26 are avoided. The manure storage facility 26 can be in the ground as shown or it can be a tank above the ground. The manure storage facility 26 normally has sufficient capacity to hold all the manure pumped from the livestock confinement area 10 in six months. Equipment is commercially available for removing manure from the manure storage facility 26 and disposing of it.

A check valve may be required in some cases to prevent water and manure from running from the manure storage facility 26 back into the manure collection hopper 16. If a check valve were required, it would be placed in the pipe 24.

The pump 19 includes a cylinder 28 and a piston 30. The cylinder has a top wall 32, side walls 34 and 36 and a bottom wall 38. These walls as shown are fabricated from heavy steel plates to form a cylinder with a square cross section. The actual shape of the cross section could be round, rectangular or any other desired shape. At least the inside surfaces 40, 42, 44 and 46 of the top wall 32, side walls 34 and 36, and the bottom wall 38 may be heat treated steel to reduce wear.

The piston 30 is fabricated from steel plates which form a top wall 48, a bottom wall 50 and side walls 52 and 54. The outside surfaces of the piston walls, top wall 48, bottom wall 50, side walls 52 and 54, may be heat treated steel to reduce wear. The outside dimensions of the piston 30 are sufficiently less than the inside dimensions of the cylinder 28 to ensure that there is no interference to movement of the piston 30 in the cylinder. However, the piston 30 must be large enough to prevent the excessive passage of manure between the piston 30 and the cylinder 28. The normal range of sizes for square pistons 30 is from eight inches to eighteen inches across.

A slot 56 is cut into the side wall 52 and a slot 58 is cut into the side wall 54 of the piston 30. Both slots 56 and 58 are cut into the side walls 52, 54 from the rod end of the piston to provide a passage for the connecting rod 22. The end of the slots 56 and 58 remote from the rod end of the piston form arcuate bearing surfaces 60 and 62.

A plate 64 is welded to the inside surface of the piston side wall 52. A similar plate 66 is welded to the inside surface of the piston side wall 54. The plates 64 and 66 have slots 68 and 70 which correspond to the slots 56 and 58 and terminate in arcuate bearing surfaces 72 and 74.

A plate 76 is welded to the plate 64 and a plate 78 is welded to the plate 66. The plates 76 and 78 preferably extend from the bottom wall 50 to the top wall 48 of the piston 30. A circular aperture 80 in the plate 76 has an axis which extends transversely across the piston 30 and coincides with the axis of a circular aperture 82 in the plate 78. The axis of the circular apertures 80 and 82 coincides with the center of curvature of the arcuate bearing surfaces 60, 62, 72 and 74 in the two piston side walls 52 and 54 and in the two plates 64 and 66.

A gate assembly 84 is pivotally secured by a pin 86 extending between the plates 76 and 78 adjacent the top wall 48. The gate assembly 84 includes an upper section 88, a lower section 90 integral with the upper section and a pair of integral pipe members 92 and 94 surrounding the pin 86. The pin 86 passes through a pipe 96 which is rigidly secured to a spacer bar 98 that is welded to the top wall 48 of the piston 30 and extends from the plate 76 to the plate 78. Stop members 100 and 102 are welded to the plates 76 and 78 adjacent the bottom wall 50 of the piston 30 to limit pivotal movement of the gate assembly 84 about the axis of the pin 86. Pivotal movement of the gate assembly 84 about the axis of the pin 86 in the other direction is limited by the top wall 48 of the piston 30.

The pin 86 which pivotally supports the gate assembly 84 is positioned on the rod end side of axis of the circular apertures 80 and 82 in the plates 76 and 78. The upper section 88 and the lower section of the gate assembly 84 extend from the plate 76 to the plate 78. The upper section 88 of the gate assembly 84 is always between the plates 76 and 78. The lower section 90 of the gate assembly 84 is always between the plates 76 and 78 except for a portion of the free end of the lower section 90 when the gate assembly 84 is in its upper open position. This position of the pin 86 substantially reduces the possibility of material wedging the gate assembly 84 open.

When the gate assembly 84 is in the closed position against the stops 100 and 102, the bottom free edge 104 of the gate assembly 84 is spaced above the bottom wall 50 of the piston 30. This space is provided to keep material entering the pump from wedging between the bottom wall 50 and the bottom free edge 104 and holding the gate assembly 84 from pivoting about the axis of the pin 86.

The gate assembly 84 is positioned on the connecting rod end of the piston 30 from the axis of the circular apertures 80 and 82 when the gate assembly 84 is in contact with the stop members 100 and 102. In this position the gate assembly 84 is about in the center of the piston 30 between the head end and the rod end. This location of the gate assembly 84 provides higher efficiency than similar pumps with the gate assembly 84 positioned on the head end of the piston 30.

The lower section 90 of the gate assembly 84 extends down and away from the upper section 88 of the gate assembly 84 when the gate assembly is fully open and the upper section 88 is in contact with the top wall 48 of the piston 30.

The lower end of the connecting rod 22 has two legs 106 and 108. The leg 106 has an integral circular disc 110 which is inserted in the circular aperture 80 in plate 76 of the piston 30 from the outside. An identical circular disc 112 is integral with the leg 108 and is inserted in the circular aperture 82 in the plate 78 of the piston 30. To assemble the pump 19, the legs 106 and 108 of the connecting rod 22 are sprung apart and their free ends are slipped over the outside of the piston. The integral circular discs 110 and 112 are then allowed to enter the circular apertures 80 and 82. The piston 30 is then inserted in the cylinder 28. The side walls 34 and 36 then hold the integral circular discs 110 and 112 in the circular apertures 80 and 82. The ends of the two legs 106 and 108 have arcuate surfaces which contact the arcuate bearing surfaces 60, 62, 72 and 74 of the piston 30.

In operation, one end of the connecting rod 22 is moved in a circular path by a crankshaft in the pump drive 20 and the piston 30 is reciprocated back and forth in the cylinder 28. On the return stroke, material to be pumped forces the gate assembly 84 open and passes through the piston 30. On the pumping stroke, material to be pumped contacts the lower section 90 of the gate assembly 84 and forces the gate assembly away from the top wall 48 of the piston 30. The gate assembly 84 pivots about the axis of the pin 86 until movement of the gate assembly 84 about the axis of the pin 86 is stopped by the stop members 100 and 102. Continued movement of the piston 30 into the cylinder 28 causes material in the cylinder to be forced into the pipe 24, and material in the pipe 24 to be forced out into the manure storage facility 26. During the pumping stroke, manure in the manure collection hopper 16 is sucked into the cylinder 28. This manure opens the gate assembly 84 and passes through the piston 30 on the return stroke.

The piston 30 and the cylinder 28 are shown as square in cross section. Obviously, they could be rectangular or some other shape and work as well.

We claim:

1. A manure transfer pump including a pump cylinder mounted in the bottom of a manure collection hopper in the floor of a livestock confinement area, a pump cylinder inlet end opening into the manure collection hopper and a pump cylinder exit end, a pipe with an inlet connected to the pump cylinder outlet and an outlet capable of discharging manure into a manure storage facility characterized by a piston slideably mounted in the pump cylinder and including a top wall, side walls and a bottom wall, on open rod end, an open head end, trunnion surfaces on the piston walls, a connecting rod pivotally connected to the piston and in contact with the trunnion surfaces, a pump drive connected to the connecting rod, a gate assembly pivotally connected to the inside of the piston walls in the center section of the piston, a stop surface on the piston walls operable to hold the gate assembly in an open position and a stop surface on the piston walls operable to hold the gate assembly in a closed position and wherein the trunnion surfaces on the piston walls have a transverse axis in the center section of the piston and the pivotal connection for the gate assembly is located adjacent one wall of the piston and between the transverse axis of the trunnion surfaces and the rod end of the piston.

2. The manure transfer pump of claim 1 characterized by the stop surface on the piston walls operable to hold the gate assembly in a closed position holding the entire gate assembly between the transverse axis of the trunnion surfaces and the rod end of the piston.

* * * * *